United States Patent [19]

Hamilton

[11] Patent Number: 4,795,067
[45] Date of Patent: Jan. 3, 1989

[54] UMBRELLA STORAGE DEVICE

[76] Inventor: Reed D. Hamilton, 12122 Broken Bough Dr., Houston, Tex. 77024

[21] Appl. No.: 55,344

[22] Filed: May 29, 1987

[51] Int. Cl.⁴ .................... B60R 7/00; A47G 25/12
[52] U.S. Cl. .................... 224/42.42; 224/915; 224/42.45 R
[58] Field of Search .......... 224/273, 915, 275, 42, 224/45 R, 42.42

[56] References Cited

U.S. PATENT DOCUMENTS

| | | | |
|---|---|---|---|
| 732,022 | 6/1903 | Young | 224/915 X |
| 1,697,763 | 1/1929 | Hall | 224/915 X |
| 2,426,113 | 8/1947 | Northcutt | 224/915 X |
| 4,378,888 | 4/1983 | Reed | 224/915 X |
| 4,700,848 | 10/1987 | Fujiki et al. | 224/915 X |

FOREIGN PATENT DOCUMENTS

| | | | |
|---|---|---|---|
| 752189 | 9/1933 | France | 224/42.42 R |
| 363250 | 8/1962 | Switzerland | 224/915 |
| 23283 | of 1894 | United Kingdom | 224/915 |
| 16010 | of 1902 | United Kingdom | 224/915 |
| 1133686 | 11/1968 | United Kingdom | 224/915 |

Primary Examiner—Henry J. Recla

[57] ABSTRACT

A device for storing an umbrella in a vehicle, comprised of a partially open storage component to store the umbrella and mounting means to install the device without requiring tools and without interfering with vehicle components.

2 Claims, 1 Drawing Sheet

UMBRELLA STORAGE DEVICE

BACKGROUND OF THE INVENTION

1. Field of the Invention

The invention relates to an improved design of a device for storing an umbrella in a vehicle. The device consists of a storage component—partially slotted to easily receive/store/access the umbrella, and a simple mounting means—affording easy installation and not interfering with other vehicle components.

2. Description of Prior Art

Umbrella holders or storage devices for use in vehicles are most often difficult and complicated to install. If mounted on the vehicle door, they require special mounting plans and special mounting screws to avoid interference with vehicle door internals. Various vehicle makes and models require different layout plans due to the difference in construction and assembly of the vehicle components.

Some storage devices are inconvenient or messy to use because of their location. They are installed on the drive shaft hump on the floor. This requires the wet and dripping umbrella to be passed over the user's lap or over the seat.

These devices—expensive to manufacture and install, unsatisfactory to use—have not been marketable.

This invention eliminates these objections and problems.

SUMMARY OF INVENTION

The invention relates to a device for storing an umbrella in a vehicle. The mounting of said device requires no tools and will not interfere with vehicle components.

It is an object of the invention to provide an inexpensive umbrella storage device which can be easily installed by users who are not mechanically inclined.

A second object is to provide a device which is universally usable on all vehicle makes and models.

Another object is to allow for easy umbrella access along with convenient storage of a wet umbrella such that the wet umbrella will not drip on the user, car seat or the car floor.

A further object is for the device to contain the rain drips until such time as it is convenient to easily drain them outside the car without removal of the device.

DESCRIPTION OF PREFERRED EMBODIMENTS

Figure 1:
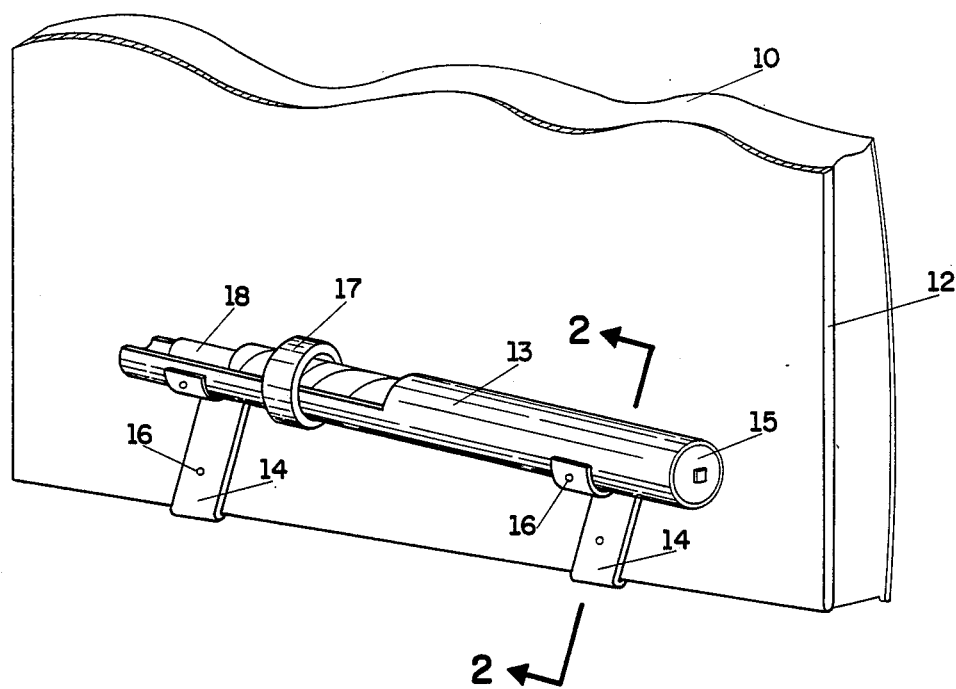
FIG. 1 is a perspective view of the umbrella storage device mounted on a vehicle left hand door.
Figure 2:
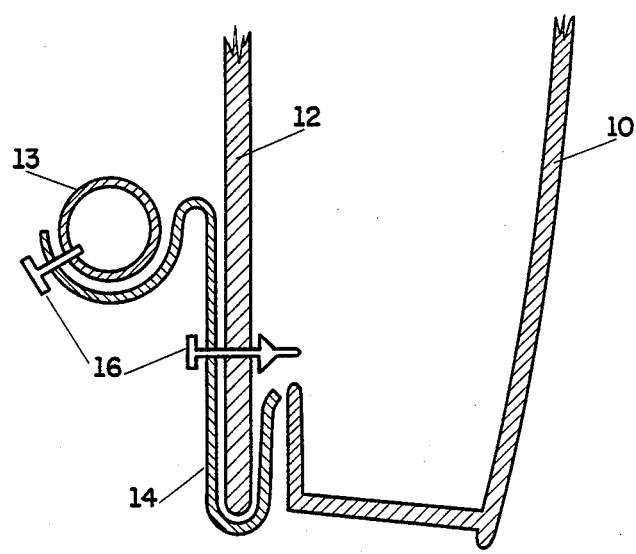
FIG. 2 is a cross section view of the device along Section 2—2 showing the mounting means.

Referring to FIGS. 1 and 2, an embodiment of the invention is shown. In this embodiment, the slotted storage component 13 is mounted on the vehicle door 10 upholstery panel 12 by the mounting means 14.

The mounting means 14 are spring clamping where they assemble to the door upholstery panel 12 to resist movement in all directions.

The mounting means in this embodiment are spring clamping where the storage component 13 assembles to it to resist lengthwise and rotational movement of the storage component 13.

Further, the mounting means 14 are different lengths to assure sloping the storage component 13 for proper water drainage.

An end closing device 15 allows for optional water drainage from the storage component 13 and can be removed to provide access for internal cleaning of the storage component 13.

Provision of the optional fixing means 16 is to absolutely assure no movement of the mounting means 14 and storage component 13, if desired.

The optional locking device 17 locks the umbrella 18 in the storage space to deter umbrella theft while vehicle is unlocked in a parking garage or lot.

Although one detailed embodiment of the invention is shown in the drawings and described above, this invention anticipates any configuration and design of components which will accomplish the equivalent results.

For example, the mounting means 14 can be fabricated as an integral part of the storage component 13.

The invention can be mounted on the vehicle front seat forward wall, on the door frame post or on the floor next to the door, all with somewhat modified mounting means.

The mounting means can be with Velcro or other means (such as magnets).

The embodiment drawings illustrate the umbrella storage device on the vehicle's left or driver's side door. The device can be utilized on any of the doors of a vehicle with slight modification of the mounting means for right side doors.

Draining of the water should be done when it is not raining or in a covered area such as a garage, by opening the vehicle door and turning the end closing device to the drain position allowing water to drain on the ground or floor.

To mount the umbrella storage device on the front wall of the front seat requires a similar but different mounting means design which utilizes the basic clamping principal or any of the other mounting means mentioned.

What is claimed is:

1. An umbrella storage device for use in vehicles comprising:
   (a) a cylindrical member enclosed on the first end for storing a closed umbrella, said cylindrical member slotted open for one-half its length on the second end with said slot wide enough to receive a closed umbrella,
   (b) a removable end closing device which closes the first end of the cylindrical member, said device to have two positions of open and closed to permit water drainage from the cylindrical storage device,
   (c) mounting means U-shaped at the first end attached to the vehicle door and semi-circular shaped at the second end clamping and cradling the cylindrical storage member, said mounting means sized to position the storage component in a sloped attitude.

2. An umbrella storage device as detailed in claim 1 wherein storage device and mounting means are integral.

* * * * *